United States Patent Office 3,106,446
Patented Oct. 8, 1963

3,106,446
MONOIODODECARBORANES AND METHOD FOR THEIR PREPARATION
Murray S. Cohen, Dover, and Sidney I. Karlan, Nutley, N.J., assignors to Thiokol Chemical Corporation, Trenton, N.J., a corporation of Delaware
No Drawing. Filed June 3, 1958, Ser. No. 739,630
12 Claims. (Cl. 23—14)

This invention relates to new compositions of matter, monoiododecaboranes, and to methods for their preparation.

The new compositions of this invention have the general formula $B_{10}H_{13}I$ and are two isomers which melt at 117–118° C. and 72–74° C., respectively. The monoiododecaboranes can be used as intermediates in the synthesis of many monosubstituted decaborane derivatives. They are also useful as a propellant fuel when incorporated with a suitable oxidizer such as ammonium perchlorate, potassium perchlorate, sodium perchlorate, ammonium nitrate, etc. The solid propellant formed is suitable for rocket power plants and other jet propelled devices. The monoiododecaboranes, when incorporated with an oxidizer, are capable of being formed into a wide variety of grains, tablets and shapes, with all the desirable mechanical and chemical properties. Propellants thus produced burn uniformly without disintegration when ignited by conventional means, such as a pyrotechnic type igniter, and are mechanically strong enough to withstand ordinary handling.

In accordance with the practice of this invention the monoiododecaboranes are produced by the reaction of decarborane with iodine monochloride in the presence of a Friedel-Crafts type catalyst, such as aluminum chloride, aluminum bromide, ferric chloride, ferric bromide, zinc chloride or the like. The method of preparation of the new compounds is more fully illustrated in the following examples.

EXAMPLE I

A 500 ml. of 3-necked flask equipped with a magnetic stirring apparatus, thermometer, dropping funnel with a bypass, and a drying tube was placed in an ice bath. To the flask there were added 30.0 g. (0.25 mole) of decaborane, 250 ml. of s-tetrachloroethane, and 6.7 g. (0.05 mole) of anhydrous aluminum chloride. The mixture was stirred and cooled to 5° C. under dry nitrogen atmosphere and 50.0 g. (0.31 mole) of iodine monochloride were added over a period of one hour so as to maintain a temperature of 5° C. The mixture was stirred at this temperature for an additional 6 hours and was then allowed to come to room temperature overnight. It was then poured over chipped ice and the organic layer was separated, washed with water to remove the color and dried over sodium sulfate.

Distillation of the solvent in vacuo left an oily residue which crystallized at room temperature. The crude solids, after washing with approximately 200 ml. of cold pentane and drying, weighed 50.0 g. and melted over a range. Two recrystallizations from approximately 1000 ml. of heptane gave 19.2 g. (31 percent) of white prisms, melting point 117–118° C. This when analyzed by wet chemical analysis was found to contain 43.71 percent boron, 50.98 percent iodine and had a molecular weight of 239.5. (The analysis calculated theoretically for $B_{10}H_{13}I$ was 43.58 percent boron, 51.14 percent iodine and had a molecular weight of 248.27.)

The pentane washes and the heptane mother liquors from the above crystallization were evaporated to dryness in vacuo. The yellow solid obtained was repeatedly recrystallized from the minimum amount of heptane to give 9.1 g. (15 percent) of light yellow crystals, melting point 72–74° C. The wet chemical analysis for this compound was 43.90 percent boron, 53.10 percent iodine; molecular weight 249.86. (The analysis calculated for $B_{10}H_{13}I$ was 43.58 percent boron, 51.14 percent iodine; molecular weight 248.27.) Infrared spectra of both isomers were obtained and confirmed both isomers to be monoiododecaborane.

EXAMPLE II

A 500 ml. of 3-necked flask equipped with a magnetic stirring apparatus, thermometer, dropping funnel with a bypass, and a drying tube was placed in an ice water bath. To the flask there were added 30.0 g. (0.25 mole) decaborane, 250 ml. of s-tetrachloroethane, and 6.7 g. (0.05 mole) of anhydrous aluminum chloride. The mixture was stirred and cooled to 5° C., under dry nitrogen atmosphere, and 0.27 mole of iodine monochloride was added over a period of one hour so as to maintain the temperature at 5° C. The mixture was stirred at this temperature for 6 hours and was then allowed to come to room temperature overnight. It was then poured over chipped ice and the organic layer was separated, washed with water to remove color and dried over sodium sulfate. Distillation of the solvent in vacuo left an oily residue which crystallized at room temperature. The crude solids, after washing with approximately 200 ml. of cold pentane and drying, melted over a range. Two recrystallizations from approximately 700 ml. of heptane gave a 25.4 percent yield of white prisms, melting point 117–118° C. The pentane washes and the heptane mother liquor from the above crystallization were evaporated to dryness in vacuo. Yellow solids obtained were repeatedly recrystallized from the minimum amount of heptane to give 11.5 percent of light yellow crystals, melting point 72–74° C. Both infrared and wet chemical analyses indicated that the two solid materials obtained were monoiododecaborane.

Other experiments conducted similarly to Examples I and II are shown on Table I. The reaction conditions

*Table I*

IODINATION OF DECABORANE

| Example No. | Solvent | $B_{10}H_{14}$ Mole | ICl Mole | $AlCl_3$, Mole | Temperature, °C. | Reaction Time (hr.) | Yield Percent |
|---|---|---|---|---|---|---|---|
| I | $C_2H_2Cl_4$ | 0.25 | 0.31 | 0.05 | 5 | 6 | c 31.2<br>d 15.0 |
| II | $C_2H_2Cl_4$ | 0.25 | 0.27 | 0.05 | 5 | 6 | c 25.4<br>d 11.5 |
| III | $C_2H_2Cl_4$ | 0.147 | 0.18 | 0.045 | 50 | 3 | 10.1 |
| IV | $CS_2$ | 0.10 | 0.125 | a 0.01 ($AlBr_3$) | 46 | 16 | 22.2 |
| V | $CS_2$ | 0.41 | 0.46 | 0.075 | 46 | b 24 | 22.6 | a Aluminum bromide was used instead of aluminum chloride.
b Allowed to stand at room tempearture for 24 hours.
c Yield of compound melting at 117–118°C.
d Yield of compound melting at 72–74° C.

varied as indicated. In Examples III, IV and V, no attempt was made to separate the two isomers formed. The results of all experiments were confirmed by infrared and wet chemical analyses.

EXAMPLE VI

A 500 ml., 3-necked round bottom flask fitted with an efficient stirrer, thermometer, dropping funnel with a bypass, and a drying tube was placed in an ice bath. Decaborane, 30 g. (0.25 mole) and 51 g. (0.37 mole) of $ZnCl_2$ in 320 ml. of sym-tetra-chloroethane were placed in the flask. The mixture was stirred and cooled to 0° C. under a dry nitrogen atmosphere and 80 g. (0.50 mole) of ICl was added to the mixture over a period of 1.5 hrs. so as to maintain a temperature of 0°–5° C. When all the ICl had been added, the temperature was kept at 0° C. for 6 additional hours and then allowed to warm to room temperature overnight. The mixture was then poured on chipped ice, the organic layer was separated and washed several times with cold water to remove the black color and dried over $CaSO_4$. After drying, it was distilled under vacuo to strip it of solvent. This procedure left tan colored solids in the flask. These solids were recrystallized three times from n-heptane to yield 31.7 g. (51.0 percent) of the isomer melting at 117–118° C.

Various modifications can be made in the procedures of the specific examples to provide other embodiments which fall within the scope of this invention. The relative amounts of decaborane and iodine monochloride employed in carrying out the reaction can be varied widely. In general, however, the molar ratio of decarborane to iodine monochloride utilized in preparing the monoiododecaboranes will be within the range from 0.1 to 10, best results being obtained, however, when approximately equimolar quantities of the two reactants are used. Likewise, the reaction temperature can be varied widely, generally being from −10° C. to 70° C. with the best results being obtained between 0° C. and 10° C. When the reaction is carried out at temperatures above about 25° C. the yield of the desired products is diminished. The reaction time can be varied widely, as the specific examples illustrate, but will generally be within the range from approximately one hour to 50 hours or somewhat more. Usually, up to a certain point, improved yields are obtained as the reaction time is increased.

The reaction between the decaborane and iodine monochloride to produce the monoiododecaboranes is carried out while the reaction mixture contains a catalytic amount of a Friedel-Crafts catalysts. Aluminum chloride, aluminum bromide and zinc chloride were utilized in the experimental work described above. In their place, however, there can be used other Friedel-Crafts catalysts, for example, ferric chloride, ferric bromide, stannic chloride and so forth. Usually, from 0.005 to 2.00 moles of the catalyst are used per mole of decaborane present in the reaction mixture. The reaction can be carried out with the reactants and catalyst admixed in a solvent reaction medium or in the absence of a solvent reaction medium. Preferably, however, a solvent reaction medium is utilized and when one is used the amount of solvent present in the reaction mixture will generally be from 400 percent to 500 percent by weight, based upon the total weight of the reaction mixture including the solvent, reactants and catalysts. The solvent utilized should be inert under the reaction conditions and can be 1,1,1-trichloroethane, 1,1-2-trichloroethane, 1,1,1,2-tetrachloroethane, pentachloroethane, trichloroethylene or tetrachloroethylene, as well as the s-tetrachloroethane used in the specific examples. On the other hand, normally liquid paraffin, cycloparaffin and aromatic compounds can also be used as the reaction medium, for example, n-heptane, n-octane, 2,2,4-trimethylpentane, cyclopentane, methylcyclopentane, cyclohexane, methylcyclohexane, benzene, toluene, the xylenes and so forth.

Both the crystalline isomers of monoiododecaborane are very soluble in benzene, ether, ethyl acetate, and methylene chloride. Although the isomers are soluble in hot heptane and sparingly soluble in the cold solvent, there is a sufficient difference in their respective solubilities to allow for separation by fractional crystallization. When recrystallized from heptane, the more insoluble, higher melting isomer exhibits two crystalline forms, either long monoclinic needles or short hexagonal prisms. The lower melting isomer deposits from the heptane as clusters or rosettes. Both isomers are insoluble in water and dissolve in ethanol and methanol with vigorously exothermic decomposition. This reaction with alcohol is far more rapid than the same reaction between decaborane and alcohol.

Monoiododecaboranes produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing the material produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other as by finely subdividing each of the materials separately and thereafter intimately mixing them. The purpose in so doing, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of this resin being to give the propellant mechanical strength and at the same time improve its burning characteristics. Thus in manufacturing a suitable propellant, proper proportions of finely divided oxidizer and finely divided boron-containing material can be admixed with a high solid content solution of a partially condensed urea-formaldehyde on phenol-formaldehyde resin, the proportions being such that the amount of the resin, is about 5–10 percent by weight, based upon the weight of the oxidizer and the boron compound. The ingredients are thoroughly mixed and the solvent-free mixture, then molded into the desired shape, as by extrusion. Thereafter, the resin can be cured by resorting to heating at moderate temperatures. For further information concerning the formulation of solid propellant compositions, reference is made to Bonell's United States Patent No. 2,622,277 and Thomas' United States Patent No. 2,646,596.

This application is a continuation-in-part application of our application Serial No. 629,197, filed December 18, 1956, now abandoned.

It is claimed:

1. Monoiododecaborane of the formula $B_{10}H_{13}I$ and having a melting point of approximately 117–118° C.

2. Monoiododecaborane of the formula $B_{10}H_{13}I$ and having a melting point of approximately 72–74° C.

3. A method for the preparation of monoiododecaboranes which comprises reacting decaborane and iodine chloride in an inert organic solvent reaction medium at a temperature within the range from −10° C. to 70° C. while the reaction mixture contains a catalytic amount of a Friedel-Crafts catalyst selected from the group consisting of aluminum chloride, zinc chloride and aluminum bromide, and recovering monoiododecaboranes from the reaction mixture.

4. The method of claim 3 wherein the Friedel-Crafts catalyst is aluminum chloride.

5. The method of claim 3 wherein the Friedel-Crafts catalyst is aluminum bromide.

6. The method of claim 3 wherein the Friedel-Crafts catalyst is zinc chloride.

7. A method for the preparation of monoiododecaboranes which comprises reacting one mole of decaborane and from 0.1 to 10 moles of iodine monochloride at a temperature within the range from 0° C. to 10° C. while the reaction mixture contains as a reaction catalyst from 0.005 to 2 moles of aluminum chloride and while the reaction mixture also contains from 400 percent by weight to 500 percent by weight of s-tetrachloroethane, based upon the weight of the reaction mixture.

8. A method for the preparation of monoiododecaboranes which comprises reacting one mole of decaborane and from 0.1 to 10 moles of iodine monochloride at a temperature within the range from 0° C. to 10° C. while the reaction mixture contains as a reaction catalyst from 0.005 to 2 moles of aluminum bromide and while the reaction mixture also contains from 400 percent by weight to 500 percent by weight of s-tetrachloroethane, based upon the weight of the reaction mixture.

9. A method for the preparation of monoiododecaboranes which comprises reacting one mole of decaborane and from 0.1 to 10 moles of iodine monochloride at a temperature within the range from 0° C. to 10° C. while the reaction mixture contains as a reaction catalyst from 0.005 to 2 moles of zinc chloride and while the reaction mixture also contains from 400 percent by weight to 500 percent by weight of s-tetrachloroethane, based upon the weight of the reaction mixture.

10. A method for the preparation of monoiododecaboranes which comprises reacting one mole of decaborane and from 0.1 to 10 moles of iodine monochloride at a temperature within the range from 0° C. to 10° C. while the reaction mixture contains as a reaction catalyst from 0.005 to 2 moles of aluminum chloride and while the reaction mixture also contains from 400 percent by weight to 500 percent by weight of carbon disulfide, based upon the weight of the reaction mixture.

11. A method for the preparation of monoiododecaboranes which comprises reacting one mole of decaborane and from 0.1 to 10 moles of iodine monochloride at a temperature within the range from 0° C. to 10° C. while the reaction mixture contains as a reaction catalyst from 0.005 to 2 moles of aluminum bromide and while the reaction mixture also contains from 400 percent by weight to 500 percent by weight of carbon disulfide, based upon the weight of the reaction mixture.

12. A method for the preparation of monoiododecaboranes which comprises reacting one mole of decaborane and from 0.1 to 10 moles of iodine monochloride at a temperature within the range from 0° C. to 10° C. while the reaction mixture contains as a reaction catalyst from 0.005 to 2 moles of zinc chloride and while the reaction mixture also contains from 400 percent by weight to 500 percent by weight of carbon disulfide, based upon the weight of the reaction mixture.

References Cited in the file of this patent

UNITED STATES PATENTS 2,894,803    Cohen et al. _____ July 14, 1959

OTHER REFERENCES

Shapiro et al.: "Journal of the Am. Chem. Soc.," vol. 81, pp. 838–841 (Feb. 20, 1959).

Schaeffer et al.: "Abstracts of Papers; 130th meeting, Am. Chem. Soc.," bears stamped receipt date of Aug. 30, 1956, page 34R.

Emeleus et al.. "Advanced in Inorganic Chem. and Radio-chemistry," vol. 1, 1959, pages 127, 137.

Hillman: "Journal of the Am. Chem. Soc.," vol. 82, pp. 1096–1099 (1960).

Hurd: "Chemistry of the Hydrides," pp. 82, 83. J. Wiley and Sons (1952).

Stone: "Quarterly Reviews" (London), vol. 9, No. 2, 1955, p. 176.

Stock et al.: "Berichte," volume 47, pages 3115–3149 (1914).

Stock et al.: "Berichte," volume 62B, pages 90–99 (1929).

Stock: "Hydrides of Boron and Silicon," pages 120–122 (1933).